Patented Feb. 26, 1935

1,992,885

UNITED STATES PATENT OFFICE 1,992,885

CONTROL MEANS FOR WINDSHIELDS

Albert T. Potter, Detroit, Mich., assignor to Ainsworth Manufacturing Company, a corporation of Michigan Application April 23, 1931, Serial No. 532,245

8 Claims. (Cl. 296—84)

This invention relates to improved means for selectively holding a windshield in different predetermined open positions and particularly to means for controlling such apparatus.

The main objects of the invention are to provide improved variable braces on the respectively opposite sides of a windshield frame and corner posts or windshield casing of a vehicle for holding the windshield in a selected open position; to provide braces of this kind which are pivoted at one end on the windshield casing and slidably mounted at their other ends on the side members of the windshield frame; to provide apparatus which is completely confined within the frame structure of the windshield for releasably holding the slidable ends of the braces against movement relative to the windshield frame in any one of a plurality of different positions, and to provide apparatus of this kind, which until released, positively holds the windshield against both opening and closing movements.

Further objects of the invention are to provide a single, conveniently located control mechanism for operating the holding apparatus of both sides of the windshield frame; to provide an operating handle in control mechanism of this kind which may be grasped by an operator and rotated for releasing the shiftable ends of the braces, and which may then be pressed upon so as to permit an operator to open the windshield with one hand; to provide flexible connecting members between the brace holding apparatus and the control mechanism; and to provide adjustable means for tensioning the flexible members which is accessible through a small and inconspicuous opening in the windshield frame, and which permits the members to be conveniently attached to the control mechanism while they are in a relaxed condition during assembly of the windshield control means.

An illustrative embodiment of the invention is shown in the accompanying drawings, in which—

Fig. 1 is an internal side elevation of a vehicle windshield which is equipped with my improved windshield adjusting means.

Fig. 2 is a transverse vertical sectional view taken on the line 2—2 of Fig. 1, and showing the windshield in an open position.

Fig. 3 is an enlarged fragmentary sectional view taken on the line 3—3 of Fig. 1, and showing the manual mechanism in detail.

Fig. 4 is a fragmentary, enlarged elevation showing the manual mechanism as viewed from the interior side of the windshield.

Fig. 5 is a rear elevation of a brace holding unit which is convenable in an end member of a windshield frame.

Fig. 6 is a longitudinal vertical sectional view taken on the line 6—6 of Fig. 5.

Fig. 7 is a transverse horizontal sectional view taken on the line 7—7 of Fig. 6.

Fig. 8 is a transverse horizontal sectional view taken on the line 8—8 of Fig. 6.

Fig. 9 is a transverse vertical sectional view taken on the line 9—9 of Fig. 6.

Fig. 10 is a vertical sectional view similar to Fig. 2 but showing a modified form of the invention.

Fig. 11 is a front elevation of a windshield brace and brace holding apparatus illustrating the form of the invention shown in Fig. 10.

Fig. 12 is a longitudinal vertical sectional view taken on the line 12—12 of Fig. 11.

Fig. 13 is a transverse vertical sectional view taken on the line 13—13 of Fig. 11.

Fig. 14 is a transverse horizontal sectional view taken on the line 14—14 of Fig. 12.

In the form shown in Figs. 1 to 9, inclusive, the invention is illustrated in conjunction with an adjustable windshield which includes a frame 1 having tubular side and end members 2 and 3, respectively. The upper side member 2 of the frame is pivotally attached to a vehicle body header bar 4 which constitutes the upper side of a windshield casing having end members 5. In some instances the corner posts of a vehicle serve as end members of the windshield casing.

Each end member 3 of the windshield frame is provided with a longitudinal opening 6 in which are mounted windshield control units of substantially identical construction, of the type shown in Figs. 5 and 6. Each control unit includes a channel-shaped support or face plate 7 having a longitudinal slot 8 which communicates with the opening 6 of the tubular end member 3. The face plate is rigidly mounted on the latter by screws 9. A brace 10 having an end slidably mounted on the support and extending into the slot 8 thereof is provided at its outer extremity with a pivotally attached bracket 11, for pivotally securing the outer end of the brace to the end member 5 of the windshield casing. The inner or lower end portion of the brace 10 is provided with an aperture through which a pin 12 extends. This pin is located adjacent the internal side of the support 7 between the side flanges 13 and 14 thereof.

Rigidly mounted on the internal side of the support 7 are spaced inwardly extending bifurcated lugs 15 and 16 which are located outwardly Patented Feb. 26, 1935

1,992,886

UNITED STATES PATENT OFFICE 1,992,886

CONTROL MEANS FOR WINDSHIELDS

Albert T. Potter, Detroit, Mich., assignor to Ainsworth Manufacturing Company, a corporation of Michigan Application April 23, 1931, Serial No. 532,246
Renewed August 11, 1934

8 Claims. (Cl. 296—84)

This invention relates to improved control means for selectively holding a windshield in different predetermined open positions, and particularly to improved operating mechanism for windshield control means of the type disclosed in my copending application Serial No. 532,245, filed April 23, 1931.

The main objects of the invention are to provide an improved variable brace for coacting between a windshield frame and the surrounding windshield casing of a vehicle for selectively holding a windshield in one of a plurality of predetermined positions; to provide a brace of this kind which is adapted to be pivotally attached to the windshield casing at one end and slidably secured at its other end to the windshield frame; to provide control mechanism for holding the slidable end of the brace against movement relative to the windshield frame which is adapted to be assembled as a unit in an opening of a tubular end member of the windshield frame; to provide means in mechanism of this kind for shifting the holding member substantially perpendicularly to the path of the slidable end of the face, to provide means of this kind which positively holds the shiftable end of the brace against downward movement from selected position so as to securely retain the windshield in an open position, and which yieldably holds the slidable end of the brace against upward movement so as to permit opening of the windshield by merely passing thereon without releasing the control mechanism; and to provide a control unit of this character which has a conveniently accessible operating trigger that may be held in a tilted position so as to release the control mechanism and simultaneously pulled upon so as to close the windshield while the control mechanism is held in a released position.

An illustrative embodiment of the invention is shown in the accompanying drawing, in which:

Fig. 1 is a vertical sectional view showing a windshield which is equipped with my improved control apparatus in an open position.

Fig. 2 is a front elevation of the windshield control apparatus shown in Fig. 1.

Fig. 3 is a longitudinal vertical sectional view taken on the line 3—3 of Fig. 2.

Fig. 4 is a transverse horizontal sectional view taken on the line 4—4 of Fig. 3.

Fig. 5 is a transverse horizontal sectional view taken on the line 5—5 of Fig. 3.

Fig. 6 is a transverse horizontal sectional view taken on the line 6—6 of Fig. 3.

In the form shown, the invention is illustrated in conjunction with an adjustable windshield which includes a frame having tubular side and end members 2 and 3, respectively. The upper side member 2 of the frame is pivotally attached to a vehicle body header bar 4 which constitutes the upper side of a windshield casing having end members 5. In some instances the corner posts of a vehicle serve as end members of the windshield casing.

Each end member 3 of the windshield frame is provided with a longitudinal opening 6 in which are mounted windshield control units of substantially identical construction. Each control unit includes a channel-shaped support or face plate 7, having a longitudinal slot 8 which communicates with the opening 6 of the tubular end member 3. The face plate is rigidly mounted on the latter by screws 9. A brace 10 having an end slidably mounted on the support and extending into the slot 8 thereof is provided at its outer extremity with a pivotally attached bracket 11, for pivotally securing the outer end of the brace to the end member 5 of the windshield casing. The inner or lower end portion of the brace 10 is provided with an aperture through which a pin 12 extends. This pin is located adjacent the internal side of the support 7 between the side flanges 13 and 14 thereof.

Rigidly mounted on the internal side of the support 7 are spaced, inwardly extending bifurcated lugs 15 and 16 which are located outwardly from the respectively opposite extremities of the slot 8 and between the sides of which are pivotally mounted bell crank levers 17 and 18. The adjacent ends of the bell crank lever 17 and 18 are connected together by a pair of laterally spaced links 19 which are identical in shape, the end portions of the links 19 bear against the respectively opposite sides of the bell crank levers 17 and 18 and they are pivotally attached to the adjacent end of the latter by pins 20 and 21, which extend through elongated apertures in the bell crank levers.

Formed in the outer edges of the links 19 are registering spaced notches 22 in which the pin 12 of the brace 10 is receivable. Each notch 22 has a lower edge which is substantially perpendicular to the face plate 7 for positively holding the pin 12 against downward movement from a selected position and an inclined upper edge for having an extremity slidably mounted in said slot, releasable locking means including a toothed member concealed in the tubular end member of said frame for selectively locking the slidable end of said brace in one of a plurality of predetermined positions, and mechanism mounted on the intermediate portion of a side of said frame for moving and guiding said toothed member away from the slidable extremity of said brace in a direction substantially normal with respect to said tubular end member of said frame to release said locking means, and including a member extending through the side and end of said frame for connecting said mechanism and said locking means for effecting the release of the latter.

5. In a structure including a windshield casing; a windshield pivotally mounted on said casing including a tubular frame; a pair of braces, one end of each brace being pivotally mounted on each end of said casing and the other end of each brace being slidably attached to the adjacent end of said tubular frame; releasable locking means including a pair of toothed members, one member being concealed in each end of said tubular frame, for releasably locking the slidable ends of said braces in various corresponding positions; and a single operating member for actuating said toothed members to release said locking means.

6. In a structure including a windshield casing; a windshield pivotally mounted on said casing including a tubular frame; a pair of braces, one end of each brace being pivotally mounted on each end of said casing and the other end of each brace being slidably attached to the adjacent end of said tubular frame; releasable locking means including a pair of toothed members, one member being concealed in each end of said tubular frame, for releasably locking the slidable ends of said braces in various corresponding positions; and a single operating member provided with an external operating handle for actuating said toothed members to release said locking means, said operating handle being pivotally mounted on the intermediate portion of the lower side of said tubular frame.

7. A windshield controlling apparatus including a brace, an element for pivotally attaching the brace to a windshield casing, a support for slidably securing an end of the brace to a windshield frame, a bar shiftably mounted on said support and having spaced notches for releasably holding the slidable end of the brace in various predetermined positions, resilient means normally holding the bar in operating position, and mechanism cooperating with both ends of the bar for shifting and guiding it from its inoperative position and in a direction substantially normal to the support, said mechanism including a flexible element adapted for manual manipulation.

8. A windshield controlling apparatus including a support adapted to be secured to a windshield frame, means slidably secured to the support and adapted to co-act with said windshield and the windshield casing so as to retain the windshield in selected open positions, a member shiftably mounted on said support for positively locking said means in selected positions, actuating means cooperating with both ends of said member for shifting and guiding the member substantially perpendicular to said support and into an inoperative position, a yieldable element for normally holding said member in an operative position and means for manually operating said actuating means and mounted on said frame in spaced reation to said support.

ALBERT T. POTTER.

movably mounted on said support having spaced notches therein for receiving said protruding element, each of said notches having a side substantially normal to said support for positively holding said brace against movement in one direction from a selected position and having an inclined side for yieldably holding said brace against movement in another direction from said selected position, and mechanism for moving said member substantially perpendicularly with respect to said support to an inoperative position.

6. In a structure including a windshield casing, a windshield including a tubular end member having an opening therein, a face plate covering said opening and having a slot therein communicating with the interior of said tubular end member, a brace pivotally attached at one end to said casing and slidably mounted at its other end in said slot, releasable mechanism mounted on said face plate and located in said tubular end member for positively holding the slidable end of said brace against movement in one direction from selected positions and yieldably holding the slidable end of said brace against movement in another direction, and a yielding element for normally maintaining said mechanism in operative position.

7. In a structure including a windshield casing, a windshield including a tubular end member having an opening therein, a face plate covering said opening and having a slot therein communicating with the interior of said tubular end member, a brace pivotally attached to said casing having an end slidably mounted in said slot, an element protruding from the slidable end portion of said brace, and a member movably mounted on said face plate having spaced notches for receiving said protruding element, each of said notches having a side substantially normal to said face plate for positively holding the slidable end of said brace against movement in one direction from a selected position and having an inclined side for yieldably holding the slidable end of said brace against movement in another direction from said selected position.

8. Windshield control apparatus including a support securable to a windshield frame, means slidably attached at one end to said support and pivotally connected at its other end to a windshield casing for coacting between said windshield casing and said windshield frame so as to retain the latter in selected open positions, a member shiftably mounted on said support adapted to positively hold said slidably attached end of said means against movement in one direction from selected positions and to yieldably hold such end of said means against movement in another direction from said selected positions, resilient elements for yieldably holding said member in an operative position, and control mechanism for moving said member into an inoperative position.

ALBERT T. POTTER.